(12) United States Patent
Schwenk et al.

(10) Patent No.: US 6,721,421 B1
(45) Date of Patent: Apr. 13, 2004

(54) METHOD FOR ENCRYPTING INFORMATION REPRESENTED AS A NUMERICAL VALUE

(75) Inventors: Jörg Schwenk, Dieburg (DE); Klaus Huber, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/355,861

(22) PCT Filed: Jan. 15, 1998

(86) PCT No.: PCT/EP98/00209

§ 371 (c)(1),
(2), (4) Date: Mar. 16, 2000

(87) PCT Pub. No.: WO98/34372

PCT Pub. Date: Aug. 6, 1998

(30) Foreign Application Priority Data

Feb. 4, 1997 (DE) ......................................... 197 03 928

(51) Int. Cl.[7] .................................................. H04K 1/00
(52) U.S. Cl. ........................................... 380/30; 380/28
(58) Field of Search ...................................... 380/28, 30

(56) References Cited

U.S. PATENT DOCUMENTS

| 4,932,056 A | | 6/1990 | Shamir | |
| 5,351,298 A | * | 9/1994 | Smith | ........................ 380/30 S |

FOREIGN PATENT DOCUMENTS

| DE | 195 13 898 | 10/1996 |

OTHER PUBLICATIONS

Simith LUC Public–Key Encrypton Dr. Dobb's Journal.*
Smith A Public–Key Cryptosystem and a Digital Signature System Based on the Lucas Function Analogue to Discrete Logaritms.*
Bleichenbacher, Some Remarks on Lucas–Base Cryptosystem.*
J. Schwenk et al., "Public Key Encryption And Signature Schemes Based on Polynomials Over N", Advances in Cryptology—Eurocrypt '96 International Conference on the Theory and Application of Cryptographic Techniques, Saragossa, May 12–16, 1996, pp. 60–71.
R. Lidl, et al., "Permutation Polynomials in RSA–Cryptsystems" Advances in Cryptology. Proceedings of Crypto 83, Santa Barabara, CA, USA, Aug. 21–24, 1983, pp. 293–301.
E. Bertekamp, "Algebraic Coding Theory", 1984, pp. 21–29.
W. Diffie et al., "New Directions in Cryptography", IEEE Transactions on Information Theory, vol. IT–22, Nov. 1976, pp. 644–654.
R. Rivest et al., "A Method for Obtaining Digital Signatures and Public–Key Cryptosystems", Communications of the ACM, vol. 27, No. 2, Feb. 1978, pp. 120–126.
W. B. Müller et al., "Cryptanalysis of the Dickson Scheme", Proc. Eurocrypt 8S, Lecture Notes in Computer Science, vol. 219, 1986, pp. 50–61.
I. Schur, "Arithmetisches über die Tschebyscheffschen Polynome", Gesammelte Abhandlungen, vol. III, Springer–Verlag, Berlin, Heidelberg, New York, 1973, pp. 422–453.
V. Varadharajan: "Cryptosystems based on permutation polynomials" International Journal of Computer Mathematics, 1988, London, vol. 23, No. 3–4, pp. 237–250.
A. Beutelspacher, Cryptology, pp. 1–135.

* cited by examiner

*Primary Examiner*—Ayaz Sheikh
*Assistant Examiner*—James Seal
(74) *Attorney, Agent, or Firm*—Kenyon Kenyon

(57) ABSTRACT

The invention relates to a method of encrypting and decrypting information using a public key and a secret key. The invention is characterized in that the secret key consists of two very large primary numbers while the public key consists of the product of both primary numbers and a permutation polynomial.

14 Claims, No Drawings

METHOD FOR ENCRYPTING INFORMATION REPRESENTED AS A NUMERICAL VALUE

FIELD OF THE INVENTION

The present invention relates to a method for decrypting a first message ("c"), which is encrypted from a second message ("m") using a public key in the form of a very large number ("n") containing various prime numbers and of a permutation polynomial. The encrypted message is formed from c=P(m) mod n and the secret key using the product of at least two prime numbers.

BACKGROUND INFORMATION

The invention relates to a method for decrypting a message c, which is encrypted from a message m using a public key in the form of a very large number n containing various prime numbers and of a permutation polynomial, the encrypted message being formed from c=P(m)mod n and the secret key from the product of at least two prime numbers.

Such methods have been known under the name of public-key encryption methods since the publication of the papers by Diffie and Hellmann (W. Diffie, M. E. Hellmann, "New directions in cryptography", IEEE Transactions on Information Theory, Vol. IT-22, November 1976, pages 644–654) and by Rivest, Shamir and Adleman (R. Rivest, A. Shamir and L. Adleman, "A method for obtaining digital signatures and public-key cryptosystems", Communications of the ACM, Vol. 27, No. 2, February 1978, pages 120–126, RSA methods). In contrast to conventional methods, these public-key encryption methods employ two keys, of which one key is public and the associated second key is secret. In order to encrypt a message, the sender uses the publicly accessible key of the recipient, who alone is able to decrypt this encrypted message using the secret key known to him. This method considerably facilitates key management, because, in particular, it is no longer necessary to communicate the secret key, hitherto required for decryption, via a secure channel to the recipient.

Some examples of the application of public-key methods are described in detail in the publication by A. Beutelspacher "Kryptologie" [Cryptology], Vieweg-Verlag 1994.

From the literature reference VARADHARAJAN, V: "Cryptosystems based on permutation polynomials," INTERNATIONAL JOURNAL OF COMPUTER MATHEMATICS, 1988, London (GB), Vol. 23, No. 3–4, it is known that in public key methods permutation polynomials are used to encrypt messages. For decrypting, it is proposed in this literature reference to use the polynomial that is inverse to the permutation polynomial. The known data encryption method thus presupposes that there is an inverse function to the permutation polynomial of the encryption, this function being in practice easy to use for decrypting. This means that in accordance with this related art only permutation polynomials can be used for which there exists an inverse function which is of the type that can be used in calculation at all. This known method therefore has the disadvantage that not all permutation polynomials can be used for encrypting messages. Permutation polynomials are known which have relatively few coefficients, but the corresponding inverse polynomial includes a multiplicity of coefficients which in addition can possess a very high numerical value. However, it is not possible in practice to work with inverse functions of this type, if outlays for computation are to be reasonable.

The publication DE 195 13 898 A1 likewise discloses a public-key method for the encryption of data. Although, with this method, the security of encryption and decryption is increased in comparison with previous methods, ambiguities occur in the determination of zeros, which is necessary for decryption. These ambiguities make it necessary to add known redundant data to each data block to be encrypted, the known redundant data making it possible to determine the correct decrypted in data.

Public-key encryption methods which use polynomials over the ring of numbers modulo a number n composed of at least two large prime numbers are already known from the literature. The RSA method can be regarded as such a method. Important examples are also those methods which are based on so-called Dickson polynomials (W. B. Müller and R. Nöbauer, "Cryptanalysis of the Dickson-Scheme", Proc. Euro-crypt 85, Lecture Notes in Computer Science, Vol. 219, 1986, p.50–61).

The object of the present invention lies in indicating a method for decrypting an encrypted message, the method being able to work using a multiplicity of various types of permutation polynomials for which an inverse function that is easy to use does not necessarily have to exist.

The object of the present invention is achieved by a method for decrypting an encrypted message, the method having the features of claim 1.

The fact that the encrypted message c is calculated by substituting [placing] the message to be encrypted m into a permutation polynomial P(x=m)mod n, n representing the product of two very large prime numbers, makes it possible, using the secret key composed of the two large prime numbers and using the extended Euclidean algorithm, to clearly calculate message m in accordance with $m=b \cdot u \cdot p + a \cdot v \cdot q$ mod n for the statements $p(x)=P(x)-c$ mod $p$, and $q(x)=P(x)-c$ mod $q$, and for the two statements $ggT(p(x), xP-x)$ mod $p=x-a$, and $ggT(q(x), xq-x)$ mod $q=x-b$, and for the relation $u \cdot p + v \cdot q = 1$.

For decrypting the encrypted message c, the unambiguous zero point of the permutation polynomial P (x)–c mod n is calculated.

One of the advantages of the present invention is to be seen in particular in the fact that it goes beyond the known publications and creates a method for encryption and decryption which is considerably more general and makes it possible also to employ other classes of polynomials.

The objective is achieved also from the features of claim 2. This method of the present invention is marked by the fact that the number (p−1) (q−1)+1 is used as the secret key and the unambiguous zero point of the permutation polynomial P(x)−c mod n is calculated, in that the recovery of the message m is carried out by calculating $ggT(P(x)-c, x^{(p-1)}_{(q-1)}-x)$ mod n n=x−m. Similarly, a number designated as an equivalent number can also be used as the secret key, which is derived from constant·$kgV((p-1), (q-1))+1$.

The use of polynomials of the form $r \cdot x^e + s$ mod n and the use of polynomials of the form $p(X) \cdot x^e \cdot p^{-1}(X)$ mod $n$ has proved particularly advantageous, p(x) and $p^{-1}(x)$ being permutation polynomials, and $p^{-1}$ (x) being the inverse polynomial to p(x) (that is, $p^{-1}$ (p(x))=p($p^{-1}$ (x))=x mod n).

Further advantageous embodiments of the method are cited in the other subclaims 4 through 8.

The public-key method is based on the difficult mathematical problem of factoring numbers which are the product of two large prime numbers, i.e., splitting them up into the two prime numbers. In this connection, the product of two large prime numbers is used as the public key, while the secret key consists of the two prime numbers.

The essence of the method according to the invention is to be seen in the fact that, in addition to the whole number n, a permutation polynomial over the ring $Z_n$ is used as the public key. A permutation polynomial over $Z_n$ is a polynomial with coefficients and arguments from the set $\{0,1,\ldots,n-1\}$, whose function values include all elements of the set $\{0,1,\ldots,n-1\}$. An overview of the theory of permutation polynomials is provided by Lidl and Niederreiter, "Finite Fields", Encyclopedia of Mathematics Vol. 20, Cambridge University Press, 1983.

Consequently, the public key according to the invention comprises a permutation polynomial $P(x)$ and a whole number $n=p\cdot q$ which is the product of two large prime numbers p and q. The secret key then is composed of the two prime numbers p and q.

What is claimed is:

1. A method for decrypting a first message ("c") from a second message ("m"), comprising the steps of:

determining a public key which includes a permutation polynomial $P(x)$ and a product ("n") of a first large prime number ("p") and a second large prime number ("q");

forming a secret key which is composed of the first and second large prime numbers;

encrypting the first message using the public key, the secret key and the following equation:

$c=P(m)$ mod $n$, wherein $P(m)=P(x)$; and calculating an unambiguous zero point of the permutation polynomial using the following equation:

$P(x)-c$ mod $n$, wherein the unambiguous zero point is calculated for the first large prime number and the second large prime number to decrypt the first message ("c") using the following equations:

$p(x)=P(x)-c$ mod $p$, and $q(x)=P(x)-c$ mod $q$, wherein the second message ("m") is formed using the following equation:

$m=b\cdot u\cdot p+a\cdot v\cdot q$ mod $n$, and wherein $u\cdot p+v\cdot q=1$, and a and b are values which are calculated using the following equations:

$ggT(p(x),x^p-x)$ mod $p=x-a$, and $ggT(q(x),x^q-x)$ mod $q=x-b$.

2. The method according to claim 1, wherein the permutation polynomial has the form of $r\cdot x^e+s$ which is an RSA polynomial, and wherein r and s are constant variables, and e is an exponent.

3. The method according to claim 1, wherein the permutation polynomial is a Chebyshev polynomial represented as $T_e(x)$ mod n, wherein the second message ("m") is a numerical value which is mapped to the first encrypted message ("c") using the following equation:

$c=T_e(m)$ mod $n$, and wherein $T_e(x)=T_e(m)$.

4. The method according to claim 1, wherein the permutation polynomial is a Dickson polynomial.

5. The method according to claim 1, wherein the permutation polynomial is a combination of a Chebyshev polynomial, a Dickson polynomial and a particular polynomial having the form of $r\cdot x^e+s$, and wherein r and s are constant variables, and e is an exponent.

6. The method according to claim 3, further comprising the steps of:

decrypting the second message ("m") from the first encrypted message ("c") using the following equation:

$m=T_d(c)$ mod $n$, wherein d has a value which is calculated using the following equation:

$d\cdot e-1$ mod $k$, wherein k is a smallest common multiple of the following equation:

$p^2-1$ and $q^2-1$, and wherein e is an aliquant of the following equation:

$p^2-1$ and $q^2-1$.

7. The method according to claim 5, further comprising the steps of:

consecutively executing at least one of a Chebyshev polynomial, a Dickson polynomial and a generalized RSA polynomial to form a particular result; and storing the particular result as a portion of the public key.

8. A method for decrypting a first message ("c") from a second message ("m"), comprising the steps of:

determining a public key which includes a permutation polynomial $P(x)$ and a product ("n") of a first large prime number ("p") and a second large prime number ("q");

forming a secret key according to one of i) a first number provided using the equation $(p-1)(q-1)+1$, and ii) a second number provided using the equation $kgV((p-1),(q-1))+1$, the second number being substantially similar to the first number; and encrypting the first message ("c") using the public key, the secret key and the following equation:

$c=P(m)$ mod $n$, wherein $P(m)=P(x)$; and calculating an unambiguous zero point of the permutation polynomial to decrypt the first message ("c") using the following equation:

$P(x)-c$ mod $n$, wherein the second message ("m") is retrieved from the first encrypted message according to the following equation:

$ggT(P(x)-c, x^{((p-1)(q-1)+1)}-x)$ mod $n=x-m$.

9. The method according to claim 8, wherein the permutation polynomial has the form of $r\cdot x^e+s$ which is an RSA polynomial, and wherein r and s are constant variables, and e is an exponent.

10. The method according to claim 8, wherein the permutation polynomial is a Chebyshev polynomial represented as $T_e(x)$ mod n, wherein the second message ("m") is a numerical value which is mapped to the first encrypted message ("c") using the following equation:

$$c = T_e(m) \bmod n, \text{ and}$$

wherein $T_e(x) = T_e(m)$.

11. The method according to claim 8, wherein the permutation polynomial is a Dickson polynomial.

12. The method according to claim 8, wherein the permutation polynomial is a combination of a Chebyshev polynomial, a Dickson polynomial and a particular polynomial having the form of $r \cdot x^e + s$, and wherein r and s are constant variables, and e is an exponent.

13. The method according to claim 10, further comprising the steps of:

decrypting the second message ("m") from the first encrypted message ("c") using the equation:

$$m = T_d(c) \bmod n,$$

wherein d has a value which is calculated using the equation:

$$d \cdot e - 1 \bmod k,$$

wherein k is a smallest common multiple of the equation:

$$p^2 - 1 \text{ and } q^2 - 1, \text{ and}$$

wherein e is an aliquant of the equation:

$$p^2 - 1 \text{ and } q^2 - 1.$$

14. The method according to claim 12, further comprising the steps of:

consecutively executing at least one of a Chebyshev polynomial, a Dickson polynomial and a generalized RSA polynomial to form a particular result; and storing the particular result as a portion of the public key.

* * * * *